(12) United States Patent
Gadher et al.

(10) Patent No.: US 9,079,098 B2
(45) Date of Patent: *Jul. 14, 2015

(54) AUTOMATED DISCOVERY OF GAMING PREFERENCES

(71) Applicant: GTECH Canada ULC, Halifax (CA)

(72) Inventors: Bharat Kumar Gadher, Dieppe (CA); Andrew R. McIntyre, Halifax (CA); Fayez Idris, Dieppe (CA)

(73) Assignee: GTECH CANADA ULC, Moncton, New Brunswick (CA)

( * ) Notice: Subject to any disclaimer, the term of this patent is extended or adjusted under 35 U.S.C. 154(b) by 135 days.

This patent is subject to a terminal disclaimer.

(21) Appl. No.: 13/738,780

(22) Filed: Jan. 10, 2013

(65) Prior Publication Data

US 2013/0184070 A1    Jul. 18, 2013

Related U.S. Application Data

(60) Provisional application No. 61/586,547, filed on Jan. 13, 2012.

(51) Int. Cl.
*A63F 9/24* (2006.01)
*A63F 13/00* (2014.01)
(Continued)

(52) U.S. Cl.
CPC ............ *A63F 13/00* (2013.01); *G06F 19/00* (2013.01); *G07F 17/3227* (2013.01); *G07F 17/3237* (2013.01); *G07F 17/3239* (2013.01)

(58) Field of Classification Search
CPC ............ G07F 17/3227; G07F 17/3237; G07F 17/3239; G07F 17/3286

USPC .................................. 463/16, 25, 29, 42
See application file for complete search history.

(56) References Cited

U.S. PATENT DOCUMENTS 6,607,441 B1    8/2003    Acres
6,846,238 B2    1/2005    Wells
(Continued)

FOREIGN PATENT DOCUMENTS

CA        2601560 A1      10/2006
WO    2008118800 A1      10/2008
WO    2009/097538 A1     8/2009

OTHER PUBLICATIONS

United States Patent and Trademark Office, Office Action dated Aug. 25, 2014, issued on U.S. Appl. No. 13/861,282.
(Continued)

*Primary Examiner* — Damon Pierce
(74) *Attorney, Agent, or Firm* — Norton Rose Fulbright Canada LLP; Maya Medeiros

(57) ABSTRACT

Systems and methods for automated discovery of gaming preferences and delivery of gaming choices based gaming preferences are disclosed. The systems and methods may operate in real time and may detect and analyze data representing various game features and/or game player behavior and match the data with predetermined models, profiles or game player types. Game choices may then be presented to the game player based on the analysis of the data. Systems and methods to analyze and categorize the game player behavior are also disclosed, including mining data in a cluster model based analysis to identify and develop the models, profiles or game player types and to select the games to be provided for each of the identified models, profiles or game player types. A different collection of games may be provided for each of the identified models, profiles or game player types.

49 Claims, 7 Drawing Sheets

(51) Int. Cl.
*G07F 17/32* (2006.01)
*G06F 19/00* (2011.01)

(56) References Cited

U.S. PATENT DOCUMENTS

| | | |
|---|---|---|
| 7,804,995 B2 | 9/2010 | Lipton et al. |
| 8,235,811 B2 | 8/2012 | Joshi et al. |
| 2002/0122585 A1 | 9/2002 | Swift et al. |
| 2002/0142825 A1* | 10/2002 | Lark et al. ................. 463/16 |
| 2003/0032479 A1 | 2/2003 | LeMay et al. |
| 2003/0064805 A1 | 4/2003 | Wells |
| 2004/0218269 A1 | 11/2004 | Divelbiss et al. |
| 2005/0020278 A1 | 1/2005 | Krumm et al. |
| 2005/0117637 A1 | 6/2005 | Routhier et al. |
| 2005/0190180 A1 | 9/2005 | Jin et al. |
| 2007/0054738 A1 | 3/2007 | Muir |
| 2007/0219000 A1 | 9/2007 | Aida |
| 2007/0296859 A1 | 12/2007 | Suzuki |
| 2008/0020845 A1 | 1/2008 | Low et al. |
| 2008/0032787 A1 | 2/2008 | Low et al. |
| 2008/0268959 A1* | 10/2008 | Bryson et al. ................. 463/42 |
| 2008/0318684 A1 | 12/2008 | Rofougaran |
| 2010/0267439 A1 | 10/2010 | Englman et al. |
| 2010/0298040 A1 | 11/2010 | Joshi et al. |
| 2010/0317435 A1* | 12/2010 | Velu ................. 463/31 |
| 2011/0032329 A1 | 2/2011 | Bauza et al. |
| 2011/0045891 A1 | 2/2011 | Ansari |
| 2011/0298795 A1 | 12/2011 | Van Der Heijden et al. |
| 2012/0165101 A1 | 6/2012 | Krishnamoorthy et al. |
| 2013/0019024 A1 | 1/2013 | Sheth et al. |
| 2013/0093752 A1 | 4/2013 | Yuan |
| 2013/0184071 A1 | 7/2013 | Gadher et al. |

OTHER PUBLICATIONS

Patent Cooperation Treaty, Written Opinion and International Search Report dated Oct. 30, 2013, issued on PCT Application No. PCT/CA2013/000636.

United States Patent and Trademark Office, Office Action dated Aug. 22, 2014, issued on U.S. Appl. No. 13/738,790.

* cited by examiner

AUTOMATED DISCOVERY OF GAMING PREFERENCES

PRIOR APPLICATION

This application claims the benefit of U.S. Provisional Patent Application No. 61/586,547 filed Jan. 13, 2012, the entire disclosure of which is expressly incorporated herein by reference.

FIELD OF THE INVENTION

The disclosure relates to systems and methods for providing wagering games on electronic gaming machines. In particular, systems and methods are provided for automated identification of gaming preferences and presentation of a customized set of games to a player based on the identified gaming preferences.

BACKGROUND

With the emergence of server network and cloud based gaming in the wagering gaming industry a known approach is to download a library of game content to gaming machines from a centralized system. The library of game content is typically not personalized or targeted to a player's preferences, behavior, changing habits or to different types of player segments. The library of game content may be specifically targeted based on a fixed gaming property or history, so that the library is tailored to specific player types based on market research, player research or focus group studies, for instance marketing studies. Furthermore, the operators of the gaming machines and game suppliers may waste time, money and other resources developing and downloading games to thousands of machines in casinos and other venues and these games may not satisfy the unique needs and desired player experience or behavior for specific players.

To enhance the game playing experience, it may be beneficial to personalize the selection of games that are offered to individual game players. One method of personalizing a game selection is based on player identification. The method provides a choice of game content that matches the player's previous game selections or demographic information specific to the identified player. US20080032787A1 discloses a system that recommends games to a player, where the recommendation is based on personal game selection information including demographic information and/or historical game play information specific to the player. US20100298040A1 discloses a gaming recommender system where games are recommended based on theme, brand, game player demographic, past games played by the player, and length of play of games. Both of these disclosures describe the use historical data that is tied to a specifically identified player. These systems depend on player identification and cannot provide good recommendations for new players for whom there is no historical data or even for regular players when new sets of games are introduced to the gaming system. Instead, the tendency with these systems is for the player to play the same games over and over. US20070219000A1 discloses a gaming system that recommends specific games where the recommendation data is determined by the operators of the gaming system. This forces the player to select a game from among choices of games provided by the game operators. The Game player preferences are secondary to the selections of game operators. A significant problem with this approach is that the game operator recommended games might not match player's preferences. US0070054738AI and WO2009/097538AI describe games selections being based on a keyword provided by a player. These systems may not provide suitable selections since they are dependent on matching algorithms that work against the player provided keyword.

Therefore, there is a need for gaming systems and methods invoking new ways to provide game recommendations to regular players and to new players.

SUMMARY

New systems and methods for automatic discovery of gaming preferences are provided herein. In certain embodiments, the systems and methods provide personalized content for a game player in real-time. The systems and methods allow gaming machines to dynamically and in real time predict and offer game content that satisfies the real player experience as opposed to pre-loaded or downloading games based on market research or focus group studies.

The systems and methods disclosed herein provide recommendations to a player without the need for historical preferences or demographic information about the player. Player behavioral data monitoring and analysis is performed with anonymous player data, that is, the player need not be specifically identified. Further, the data can be collected and analyzed during live game play. In certain embodiments, the systems and methods monitor the player behavior in real-time and then offers game content to match, track or reflect the behavior and even mood of the player at or near that particular instant in time.

In one embodiment, a computer implemented method of operating a wagering is provided. Preferably the method operates in real time, that is, during live, actual game play by a game player. The method includes the steps of: using a processor to collect a first set of data related to game factors for game play in an ongoing game by a current game player; analyzing, with a processor, the first set of data; determining, with a processor, at least one game player type from among a set of predefined game player types for the current game player based on the analysis of the first set of data; and displaying, on a video display, a selection of games identified for the determined at least one game player type.

In another embodiment, a computer implemented method analyzing a set of data representing game player behavior is provided. Preferably the method comprises the steps of: partitioning, with a processor, a set of data into one or more game play periods, the set of data being related to one or more game factors; analyzing, with a processor, the set of data within each game play period, and creating, with a processor, at least one game player type based at least in part on the analysis of data from one or more game play periods.

In another embodiment, a wagering game system is provided. The system comprises: an electronic gaming machine configured to collect a set of data related to one or more game factors, and a modeling module to receive the set of data. The modeling module is configured to: partition the set of data into one or more game play periods; analyze the set of data within each game play period, and create at least one game player type based at least in part on data from at least one game play period.

In another embodiment, a system for modeling game player behavior is provided. The system comprises: a modeling module to receive a set of data related to one or more game factors. The modeling module is configured to: partition the set of data into one or more game play periods; analyze the set of data within each game play period, and create at least one game player type based at least in part on data from at least one game play period.

In yet another embodiment, a wagering game system is provided comprising: an electronic gaming machine configured to provide a selection of wagering games to a game player having a wagering game system registration; and a processor configured to analyze a set of data and determine at least one game player type from among a set of predefined game player types for a game player based on the analysis of a set of data related to game play by the game player.

In another embodiment, a non-transitory computer readable medium having instructions stored therein thereon is provided. When executed, the instructions are operable to cause a computerized wagering game system to: collect, with a processor, a first set of data related to game factors for game play in an ongoing game by a current game player; analyze, with a processor, the first set of data; determine, with a processor, at least one game player type from among a set of predefined game player types for the current game player based on the analysis of the first set of data; and display, on a video display, a selection of games identified for the determined at least one game player type.

BRIEF DESCRIPTION OF THE FIGURES

Certain embodiments of the invention are illustrated in the Figures of the accompanying drawings in which.

DETAILED DESCRIPTION

Figure 1:
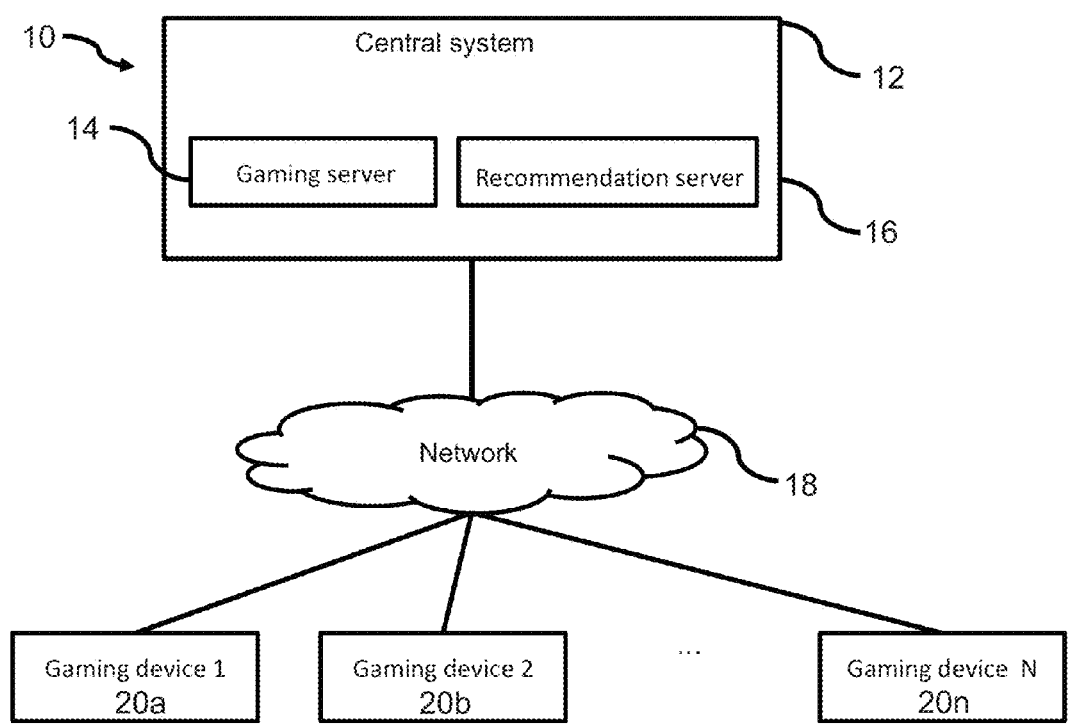
FIG. 1 is a block diagram depicting a wagering game network according to one embodiment of the invention.

For simplicity and illustrative purposes, the principles of the present invention are described by referring mainly to various exemplary embodiments thereof. Although the preferred embodiments of the invention are particularly disclosed herein, one of ordinary skill in the art will readily recognize that the same principles are equally applicable to, and can be implemented in other systems, and that any such variation would be within such modifications that do not part from the true spirit and scope of the present invention. Before explaining the disclosed embodiments of the present invention in detail, it is to be understood that the invention is not limited in its application to the details of any particular arrangement shown, since the invention is capable of other embodiments. Throughout this description, certain acronyms and shorthand notations are used. These acronyms and shorthand notations are intended to assist in communicating the ideas expressed herein and are not intended to limit the scope of the present invention. Other terminology used herein is for the purpose of description and not of limitation.

Methods and systems for providing automated discovery of gaming preferences are provided. The gaming preferences can then be used to assemble individualized recommendations of suitable games for a player. The system may operate anonymously, for instance, where the game player is unidentified or unrecognized by the gaming system. Alternatively, the game player may be identified to the gaming system, for instance through a game player account, a responsible gaming account, a social network account, or other suitable indicia of identification. In one embodiment, player game session data may be used to build a gaming and play behavior model that represents different aspects such as play, game and wagering behavior. As used herein, gaming and play behavior is represented data related to any one or more of a plurality of different game features. Game features may include, for instance: game session length; wager denominations, play rates (number of games played per time segment), typical bonus values, and other features as described below. For example, the model could include a cluster of games that are suited to players that like to play games for a shorter time with large amounts of money wagered. Another cluster includes games that are more suitable for players that like to play for longer times with smaller amounts of money. In one embodiment, when a player begins to play a game, data related to the player's game playing behavior is detected an analyzed. Based on the analysis of this data, the player can be classified, in real time, into one of the existing clusters. Once classified, the games associated the most relevant cluster are suggested to the player. The suggested games can be offered to the player in any of a variety of ways, for instance on the main game screen, on a service window or on a banner on the top, bottom or side of the screen. The suggested games can also be offered in an online gaming system.

Components of an exemplary system 10 for automatic discovery of gaming preferences are shown in FIG. 1. These include a central system 12 having a gaming server 14 and a recommendation server 16. The central system 12 may be connected by a network 18 to various gaming devices 20a, 20b, . . . 20n. The network 18 may include a social media network or other suitable network such as a WAN or LAN. Game play data may be collected from the gaming devices 20a, 20b, . . . 20n and sent through the network 18 infrastructure back to the central system 12. The gaming devices may be wired or wireless mobile gaming devices in any type of gaming setting, for instance dedicated electronic gaming machines as are commonly found in casinos and other venues.

Figure 2:
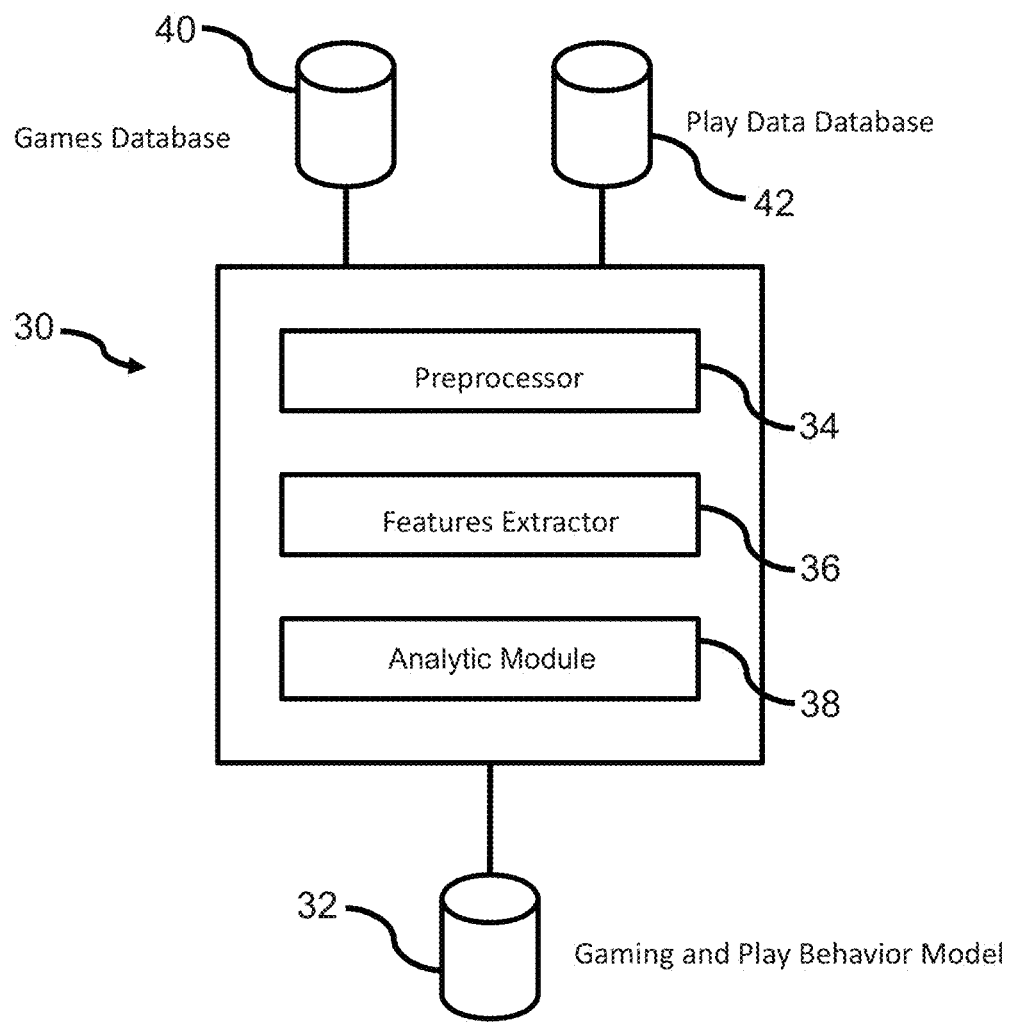
FIG. 2 is a block diagram depicting components of a system that generates the gaming and play behavior model according to certain embodiments of the invention.

FIG. 2 shows the main components of the system 30 that generates the gaming and play behavior model 32, including a preprocessor 34, a feature extractor 36, and an analytic module 38. In certain embodiments the analytic module 38 is configured to perform a clustering function, as described below. The system 30 of FIG. 2 may be provided with access to two databases, a games database 40 and a play data database 42. The play data database 42, may include two sub components: (a) raw historical transaction records collected from gaming devices during past sessions and (b) a cluster model of the raw player data. In one embodiment, the data for the historical transaction records may be stored in the form of journal files and includes historical raw play data. In particular, the raw historical transaction records may include data related to player wagering and other real-time game play characteristics including game selection; amounts of incremental wagers; wagering frequency; elapsed time; reaction to bonus rounds; reaction to progressive output as well as others. The games database 40 includes information on game titles available to players along with game data and features such as themes, denominations, characteristics, etc. Game characteristics that may be stored in the games database 40 may include average game speed; average wager amounts; average wager rate; presence and frequency of bonus rounds; presence and frequency of progressive outputs; odds of winning; prize distributions, and others.

Figure 3:
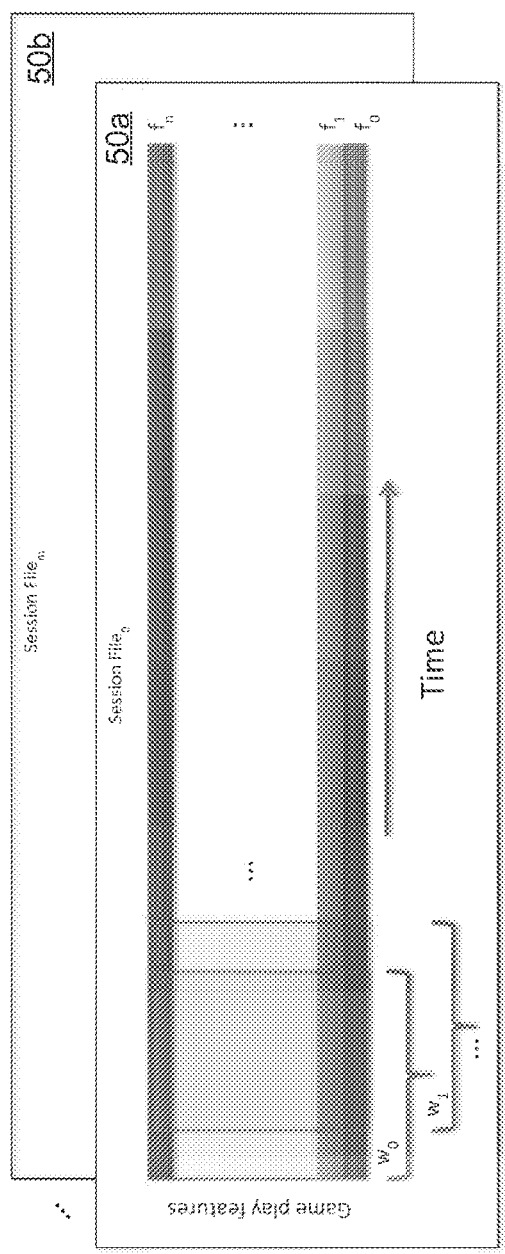
FIG. 3 illustrates a representation of play data in accordance with an embodiment of the invention.

The embodiment, the system 30 performs a training process to generate the gaming and play behavior model 32 using a play data database 42. This training may use a temporal representation of the raw historical transaction records within the play data database 42. One embodiment of a temporal representation of the raw play data is depicted in FIG. 3. In this exemplary process, the raw data within the historical transaction records is pre-processed and partitioned into different sessions 50a, 50b. In this embodiment, each session represents a continuous game play, meaning a series of games that were played in a generally uninterrupted fashion. Alternately, each session might represent a particular time period of game play, for instance 15 minutes, 30 minutes, an hour, or another suitable time period. In another alternative, each session may represent a particular number of rounds of a game, for instance 5, 10, 20 or another suitable number of rounds of a game.

As shown in FIG. 3, the play data may be represented using a window style or other graphical approach which includes a variety of different "game features" (FIG. 3, y-axis, f0 ... fn). In one embodiment, data for 28 different game features is tracked for each session. Exemplary game features include: game session length, play behavior, game behavior, game language, game location, game selection, elapsed time with one game, wagering behavior, game type, game theme, wager amounts, wager denominations, play rates, typical bonus values, game brand, prize distributions, amounts of incremental wagers, frequency of wagering, for instance the presence or absence of multiple rounds of wagering in a game, the number of rounds of wagers permitted in a game, maximum wager amounts permitted, minimum wager amounts permitted, amount of wagering, elapsed time between selected events for instance starting a new game, reaction to bonus rounds, reaction to progressive outputs, pay table features, amount of incremental wagers, frequency of wagering, elapsed time for player reaction, amount of wagering, elapsed time between wagers, frequency of player action, game rules, game complexity, ability for a player to control or have an effect on a game outcome, whether an outcome is predetermined, whether parallel wagering is provided, average game speed, average wager amounts, average wager rate, presence or frequency of bonus rounds, presence and frequency of progressive outputs, payout percentages, win rates, win percentages, loss rates, loss percentages, use of special features, frequency of use of special features, number of lines played, total amount wagered, and type of payment received.

As shown in FIG. 3, the x-axis represents time in the game session. The game features may be organized into time windows $w_0$, $w_1$ showing the occurrence of the features over time. Collectively the representation of the data as shown in FIG. 3 allows for analysis and detection of "play patterns" through the data and through the various sessions. The size of the window is adjustable and defines a minimum number of incidents necessary to categorize behavior. For instance, in one embodiment, the window size may be set to, for instance, 12 play actions, so that whenever there are 12 play actions in a session the feature may be used as part of the characterization of the game play behavior. This representation has several advantages:

1) Captures behavior as temporal patterns of the play features;
2) Variations in session length are not a factor (so long as sessions meet the minimum length);
3) Game titles can be introduced to map player behavior into game preferences.

Referring back to FIG. 2, the analytic module 38 is a software application or program used to perform a statistical data analysis. In one embodiment, the analytic module 38 is configured to perform a cluster analysis, for instance to group play data into different clusters. Additionally, the analytic module 38 may be configured to analyze the play data and identify the different clusters based on this analysis, before grouping the data into the different clusters. Any suitable clustering algorithm may be used for performing the statistical data analysis and grouping the data into appropriate clusters to form a cluster model. Preferably, a scalable clustering approach that allows for a selection of the number of clusters and support for automatic feature selection is used. In one embodiment, a cluster model is developed automatically using clustering techniques operative for handling and working with large datasets. Preferably the data analysis techniques support streaming (i.e., where the cluster model is updated as new data supports development or modification to the clusters, for instance based on drift in the underlying game play data and behavioral concepts). As used herein, the cluster model includes the identification of different clusters as well as the features relied on to distinguish these clusters.

In one embodiment a two stage hierarchical training process is employed. The analytic module 38 generates a gaming and behavior model. The model includes a number of clusters where each cluster represents a set of game features. Suitable game features are described throughout this disclosure. Groups of clusters may be assembled and assigned to particular gaming trends or behaviors. For instance, a group of clusters may be assembled to identify game players that prefer short games with relatively low wagers. Another group may be assembled for game players that prefer games with multiple rounds of betting or larger wager amounts.

As an alternative to or in addition to clustering, the statistical analysis may employ other data analytic techniques such as factor or regression analysis.

Figure 4:
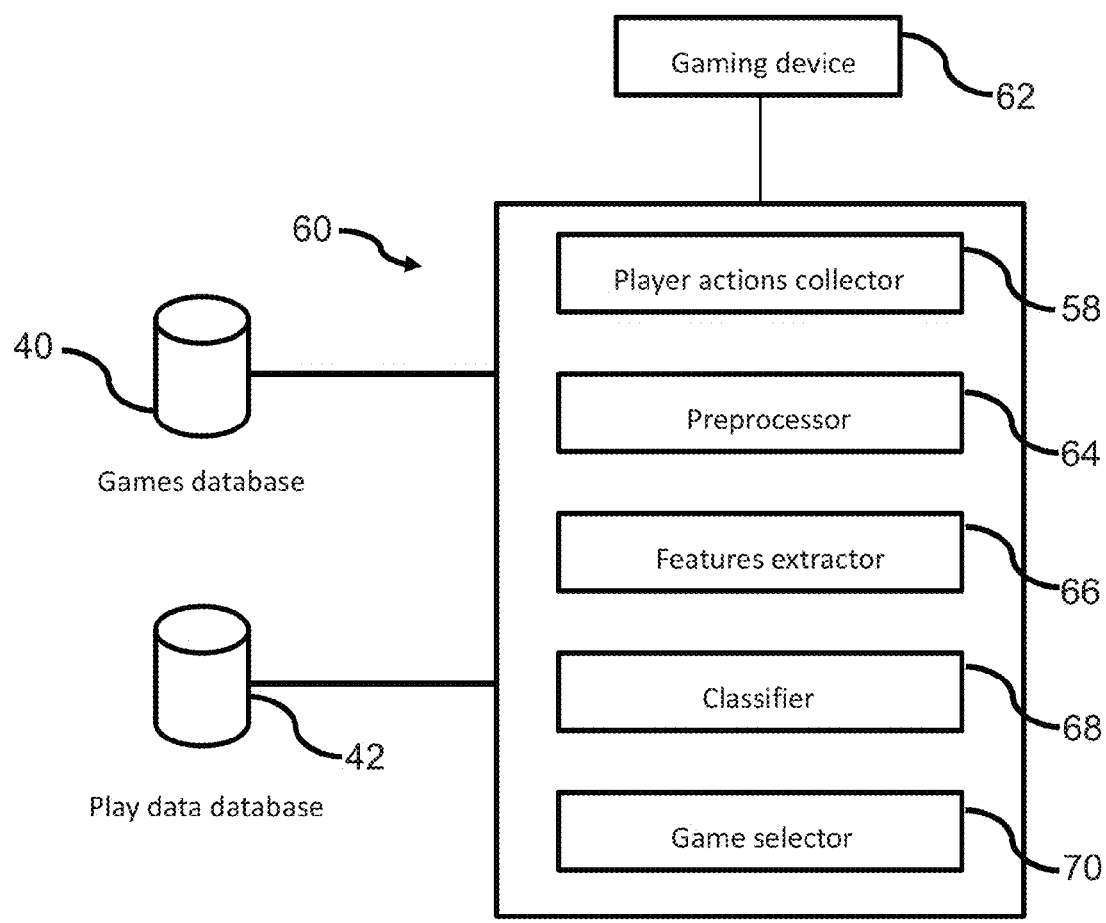
FIG. 4 is a block diagram depicting components of an exemplary system for automatic discovery of gaming preferences in accordance with an embodiment of the invention.

FIG. 4 depicts components of an exemplary system for automatic discovery of gaming preferences 60. In this embodiment, a player actions collector 58 collects data related to actions taken by a player during game play. This data may include various game features, suitable game features are described throughout this disclosure.

In one embodiment, the player actions collector 58 collects player data from the moment a player inserts a player card or begins a wagering game, for instance by inserting a wager, or pressing a start button or otherwise providing an indication of a player's desire to play a wagering game. In certain embodiments, the player data comes directly from the gaming device 62. The system may be configured to collect data for a predetermined or preset length of time, which time period may be adjustable by the game operator. Software in the system may be configured to perform a preprocessing step, involving cleaning the data collected by the player actions collector 58 with a preprocessor 64. Cleaning the data may involve any one or more of the following subtasks: noise reduction or removal, identification and removal of outlying data entries, and resolving inconsistencies in the data. Cleaning may also refer to taking data in a raw or uncleaned state or form and converting the data into a form that is better suited for a mining or modeling task. For instance, cleaning may include processing or removal of extraneous or unnecessary data such as meta data, tags, or empty fields. Software in the system may also be configured to filter the data from the player actions collector 58 with a features extractor 66. In this context, filtering refers to a specific approach to feature extraction where redundancies (i.e., attributes carrying less information) are eliminated by a function or ranking process. Other techniques for data manipulation may also be used or they may be used in the alternative, for instance wrapper, embedded and search based models of data management and manipulation. The preprocessing step and feature extracting steps may be performed separately, in sequence or in parallel, or they may be performed together. Similarly, the software module or engine(s) that perform these steps may be provided separately or together.

In one embodiment, in a pre-defined time period, for instance a time period beginning from the start of game play, the system for automatic discovery of gaming preferences 60 begins to attempt to match the player's session gaming behavior with one or more specific clusters of game content that have previously been identified by the data mining steps, described herein (those steps involved in cluster model generation or other suitable analysis). The result of this matching are used to determine which of the one or more previously identified clusters of game content are most closely matched with the player and game wagering behavior. In one embodiment, each previously identified cluster of game content is matched to at least one unique game player type. In this way, the player may be assigned one of several game player types. The matching and determination of a game player type may be determined by a classifier 68 in a classifying or determining step where the game player is classified into a game player type.

In another embodiment, a player may provide and the system may receive a selection of a game to play from the game player. This selection may be used in the determination of the at least one game player type.

In another embodiment, a player may provide or the system may receive (either from the player or otherwise) geographical data related to the location of the game. This geographical data may be provided by the game operator. This geographical data may be used in the determination of the at least one game player type.

In another embodiment, a player may provide or the system may receive (either from the player or otherwise) data related to the language of the game. This language data may be provided by the game operator or a game itself. This language data may be used in the determination of the at least one game player type.

After or responsive to the determination of a game player type, the player is provided with a plurality of games from which to choose from. The plurality of games may be provided to the player (chosen via a game selector process 70) that is better matched to the game player type through a real-time window on the gaming machine. The player may be offered a choice on whether they would like to be informed of new games before initiating the first game play. The recommender system may send an alert message to the gaming machine during the game play or at the end of a game. The alert message may provide new or different game selections expected to satisfy the player experience for the identified game player type. Alternatively, or additionally, the selection of different games may be provided to the player on a video screen between rounds of a game.

Alternatively, the player may be offered a choice of selected games based on the identified game play type through a separate area on the screen of the gaming machine. In such an embodiment, the new game may run and operate and be displayed in the same separate area on the screen of the gaming machine. In this embodiment, the player has the option of playing the pre-loaded game on the machine and, at the same time, trying out one or more games suggested based on the identified game player type. The new games suggested to the player could be different themes and genre (linked, community, social, progressive, tournament, episodic etc.) than the pre-loaded games on the gaming machines. In addition, in another embodiment the system may recommend games based one or more time slices, where a time slice represents a discrete duration of activity, such as game play. For instance analysis of a 7 day time slice may provide a different game player type and selection of games than an analysis for the same player based on a longer time slice, for instance a 10 day time slice. The system may be configured to calculate the differences between the two analyses (the 7 day time slice and the 10 day time slice). The system may then recommend games based wholly or in part on only the more recent or longer duration time slice. Alternatively, the system may recommend games based on a combination of the recent time slice match and the longer time slice match. Further, the system is configured to have the ability to store and partition data to later defined time slice based patterns. In this instance, the system is configured to allow for time slicing a data set into discrete time slices, as an example, 1 hour slices, or 1 day slices, or whatever time period is deemed desirable by the game operator.

In another embodiment, a player, either unregistered or registered, may be prompted, at least once, by an electronic gaming machine, to agree to the system monitoring his game playing. Alternatively, or additionally, the player may be prompted to agree to the system collecting game play data related to the activity of the player. Accordingly, the methods may include the steps of: receiving an indication of agreement to monitoring of game play from the game player, and/or receiving an indication of agreement to collection of game play data from the game player. According to subsequent live game playing data collection and analysis, the player may then be presented with a set of games selected to match the player's gaming preferences. Further, the system may update or change the player's game player type based on live or near live game playing data or metrics. In one embodiment, the system may update the player's game player type after a predetermined number of games are played or after a predetermined length of time. The predetermined number of games or predetermined length of time may be set by a game operator, for instance a casino of electronic gaming machine operator or by the game player, for instance by requesting that the game player input how often or frequently they would like to be presented with a new selection of games. The unregistered player may be prompted again to agree to the system monitoring his game playing at another electronic gaming machine within the same establishment (for instance a casino or a video lottery terminal system with geographical limits, or within geographical limits, for instance, by an online gaming system).

In another embodiment, a registered player having an account or other method by which the player might be identifiable to a gaming system is logged into the system, for instance with an electronic gaming machine, or online, and is prompted for approval at least once, at the electronic gaming machine or online, to agree to the system monitoring his game playing. According to subsequent live game playing data collection and analysis the player may then be presented with a set of games selected to match the player's gaming preferences. For instance, the system may have previously assigned the player a game player type based on historical game play data. Further, the system may update or change the player's game player type based on live or near live game playing data or metrics. In one embodiment, the system may update the player's game player type after a predetermined number of games are played or after a predetermined length of time. The predetermined number of games or predetermined length of time may be set by a game operator, for instance a casino of electronic gaming machine operator or by the game player, for instance by requesting that the game player input how often they would like to be presented with a new selection of games.

In one embodiment, a registered player has a responsible gaming account or profile. In such an embodiment, the system is configured to consider data or other information from the responsible gaming account in determining the profile for the player or in adjusting a game selection previously offered to a player or previously determined without consideration of the existence of a responsible gaming account or data associated with that account. In adjusting a game selection, the system may take a selection of games based on a determined player profile and then add or remove games, the addition or subtraction of games being based on the data associated with or the presence of the player registration or the responsible gaming account. In one embodiment, the system may recommend a selection of games in whole or in part also due to the existence of the responsible gaming profile of the player, in addition to, or as an alternative to, data associated with the responsible gaming profile. The responsible gaming data may be processed by the system but stored separately, for instance in a separate responsible gaming database or module. In one embodiment, the methods include the step of determining that the wagering game system has responsible gaming data related to registered game players and including the responsible gaming data in the determination of the at least one game player type. Additionally, the system may recommend at least one game to the current player that has previously been recommended to registered game players having the same game player type, a similar game player type or a substantially similar game player type.

For a non-registered player, or a player that is unidentified to the gaming system, if the player profile resulting from a live session based analysis falls within a particular risk category, or otherwise identifies certain risk factors, then the system, may, in part or whole, recommend a selection of games which it would otherwise recommend to registered players also having that risk category.

In another embodiment, the player may request to be presented with a new selection of games, for instance at any time during game player. In one such embodiment, the player would press a button or other indicator to cause the machine to present a new selection of games based on recent or historical game play behavior.

Figure 5:
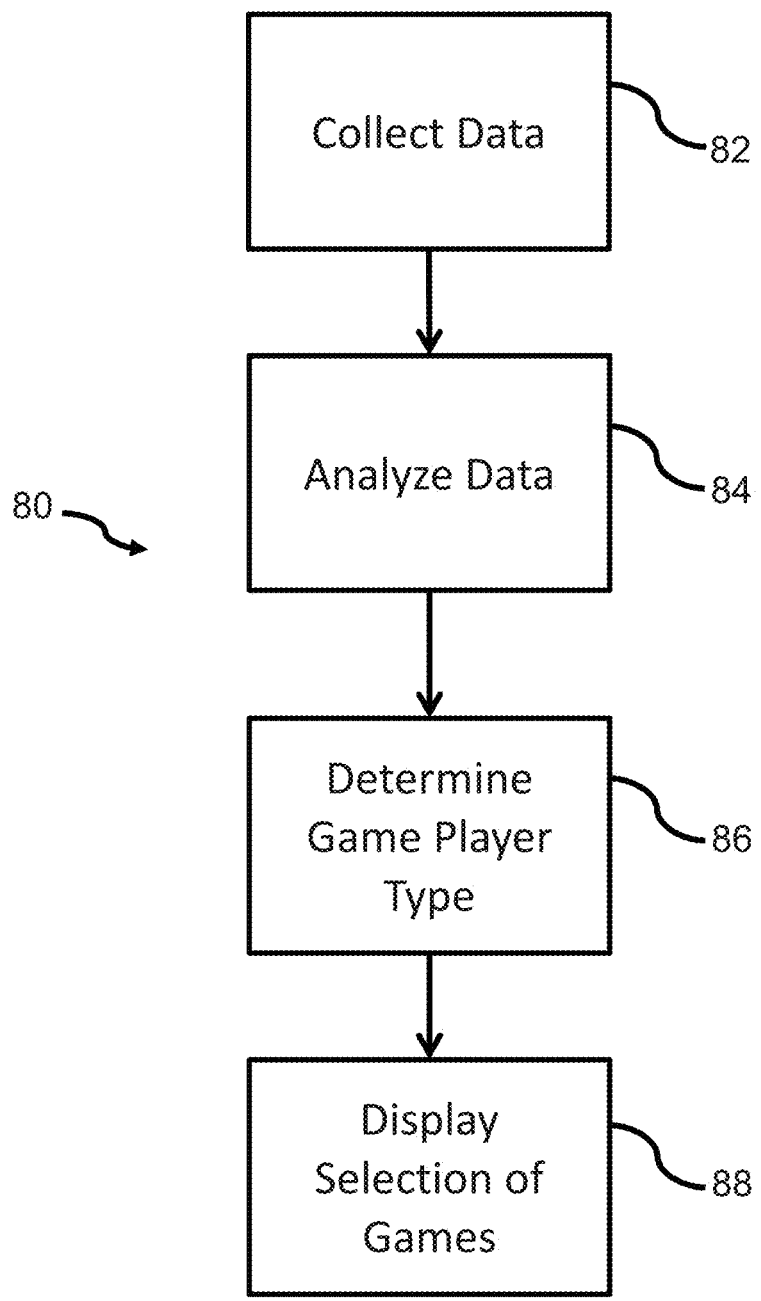
FIG. 5 is a flowchart illustrating a method of determining and providing a selection of games for a player.

Referring to FIG. 5, in a method that may either be performed as a separate embodiment of the inventive concepts of this disclosure or as a continuation of the steps described below to create a game player type, or identify a selection of games, from a collection of data related to game play, a set of method steps 80 may be used to discover the gaming preferences of a game player and to present the player with a selection of games predicted to match those gaming preferences. The steps including collecting at or near real-time data 82 representative of ongoing game play, analyzing this data 84, optionally determining a game player type 86 and then presenting the game player with a set of games to play 88, where the set of games is selected based on preferences detected from the player's unique behaviors or preferences detected from the data representative of ongoing game play.

Additionally, the gaming preferences of a player and even game player type may be derived or obtained from a player's social networking accounts. In this instance, the system would customarily request permission to access the player's social networking account. This embodiment where social networking information or data is factored in to the selection of games or the determination of the game player type may be used only with registered players, or it may also be used with players that are unregistered or unidentified or even those that do not have a player account. In such instance, the wagering game system may be hold or have no access to information or any player account identifying the player to the wagering game system. The persona may be derived through proprietary software or third party available software. The persona may be used in part to recommend games to registered players or even to players which have patterns similar to registered players being offered the selections. In addition, eligible games may be offered for selections which are non-wagering games, online games as well as wagering games for electronic gaming machines.

Referring again to FIG. 5, in a method similar to that described above, that may be performed as a separate embodiment of the inventive concepts of this disclosure, a set of method steps may be used to discover the gaming preferences of a game player 80. The steps including collecting at or near real-time data representative of ongoing game play 82, analyzing this data 84, optionally determining a game player type 86 and then optionally presenting the game player with a set of games to play 88, where the set of games is selected based on preferences detected from the player's unique behaviors or preferences detected from the data representative of ongoing game play. In this method, the gaming preferences of a game player may be determined to some extent even without the steps of determining a game player type 86 and displaying a selection of games 88.

The method includes the step of collecting a set of data related to game factors for game play in an ongoing game by a current game player 82. This collection of data is performed during a game player's actual game play, in real time or near real time. These game factors may be the same as or a larger set or subset of the game factors described above with respect to analyzing the larger data set used to generate game player types. A separate software module may be provided to handle collection of the data and this module may be provided in any suitable location or device, for instance, a gaming device, a controller in a gaming venue, a local system in the gaming venue, a system in a data center, a system in a social media network or in a private cloud, public cloud, hybrid cloud or community cloud.

The method also includes the step of analyzing the collected set of data 84. Certain game factors, or indicators, may be weighted or the dimensions of measurement adjusted so that they are more important or less important than other factors in the overall analysis of the data. In one embodiment, the data analysis is performed using a cluster analysis of the collected set of data. Additionally, or alternatively, the analysis may simply involve identification of particular game factors, the frequency of these game factors, any trends in the appearance of the game factors (for instance, whether particular actors tend to appear closer together in time), or a combination of these different indicators.

The method may also include determining at least one game player type 86 for the current game player based on the analysis of the collected set of data. As described above, for instance, the analysis may reveal that a game player continually selects different games. The system may, for instance, interpret and determine this as an indicator that the player does not favor games of the type that he stopped playing and use this information to assign the player an appropriate game player type. In another example, if the game player continues to play longer games with multiple rounds of wagers, then the system would identify a game player type that exhibits these features.

The system may then display, on a video display, the selection of games 88 identified for the game player type determined by the analysis of the collected set of data. The player may then make a selection of the one of the displayed games and the game machine presents the selected game to the player. For instance, the selection of games may be presented on a video lottery terminal, electronic gaming machine, personal computer, laptop computer, tablet, mobile phone, or a functional equivalent of one of the foregoing.

Figure 6:
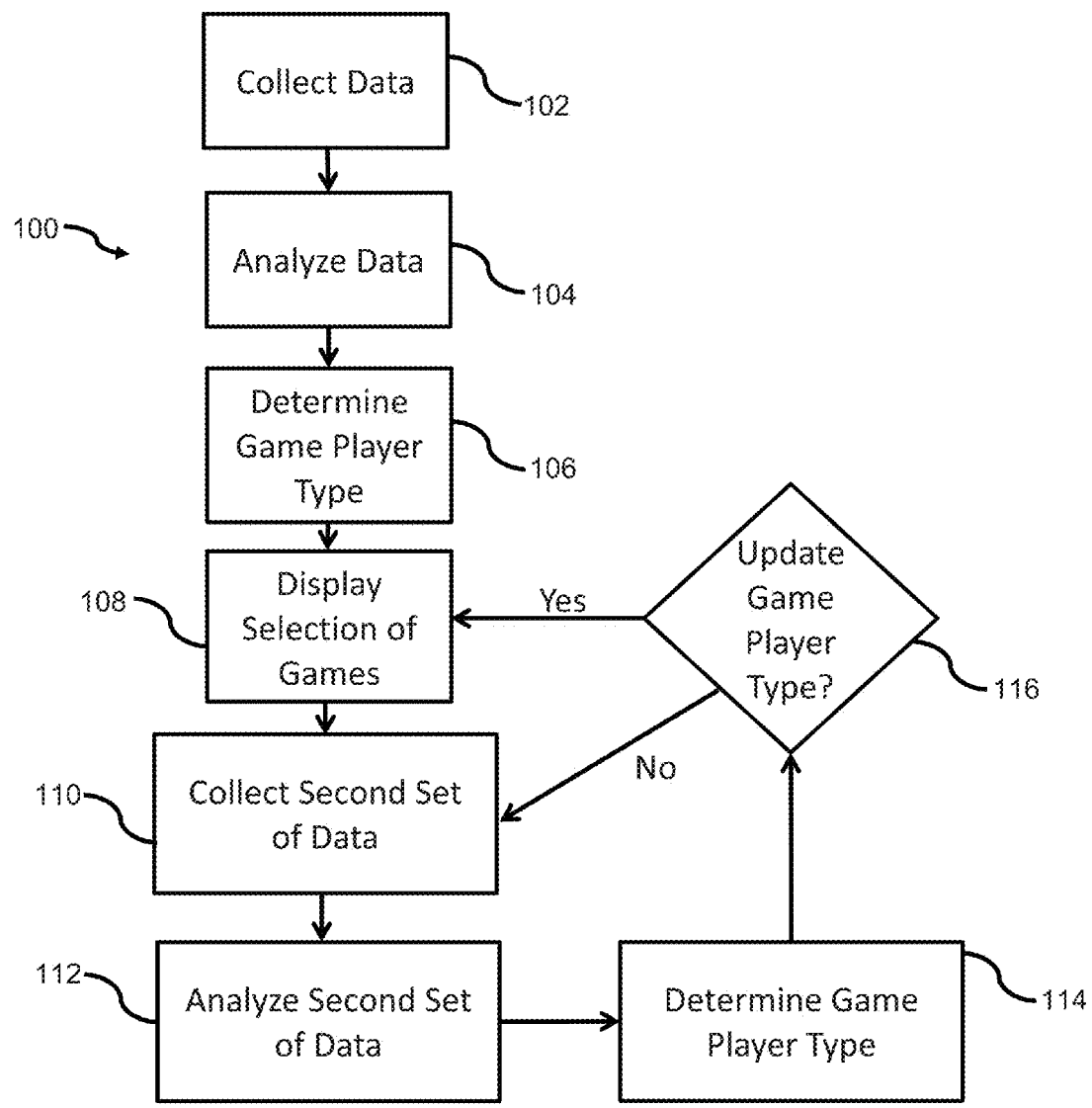
FIG. 6 is a flowchart illustrating another method of determining and providing a section of games for a player.

FIG. 6 shows another embodiment of a method 100 to discover the gaming preferences of a game player and to present the player with a selection of games predicted to match those gaming preferences. The method of FIG. 6 including steps of collecting data 102 representative of ongoing game play, analyzing this data 104, optionally determining a game player type 106 and then presenting the game player with a set of games to play 108, similar to the steps described above with reference to FIG. 5. Additionally, FIG. 6 shows the step of collecting a second or additional set of data 110 related to game factors for game play in an ongoing game by a current game player. Specifically the collection of data 102 and analysis of this data 104 may be performed in a manner similar to that described above with reference to FIG. 5. Thus, this collection of data 110 is performed at or near real time during ongoing actual game play by a game player. The second or additional set of data may be provided in a time period separate from (for instance after) or overlapping the first set of data. The second set of data may relate to a longer period of time than the first set of data. Alternatively, the second set of data may relate to a different set of game factors than the first set of data.

These game factors may be the same as or a larger set or subset of the game factors described above with respect to analyzing the larger data set used to generate game player types and suitable game factors are described throughout this disclosure. Additionally, the second set of data may be larger than the first set of data.

The method may also include the step of analyzing the second set of data 112. Certain game factors may be weighted or the dimensions of measurement adjusted so that they are more important or less important than other factors in the overall analysis of the data. In one embodiment, the data analysis is performed using a cluster analysis of the second set of data. Additionally, or alternatively, the analysis may simply involve identification of particular game factors, the frequency of these game factors, any trends in the appearance of the game factors (for instance, whether particular actors tend to appear closer together in time), or a combination of these different indicators.

The method may also include determining at least one game player type 114 for the current game player based on the analysis of the second set of data. For instance, the analysis may reveal that a game player continually selects different games. The system may, for instance, interpret and determine this as an indicator that the player does not favor games of the type that he stopped playing and use this information to assign the player an appropriate game player type. In another example, if the game player continues to play longer games with multiple rounds of wagers, then the system would identify a game player type that exhibits these features. Thus, in this way, the system may continually monitor, collect data, and update a current game player's previously-determined game player type. In one embodiment, the step of determining the at least one game player type for the current game player includes factoring and/or updating a previously identified game player type.

In one embodiment, the step of determining at least one game player type for the current game player based on the analysis of the second set of data involves determining that at least one updated game player type is different from a previously identified game player type. In this embodiment, the method may further include the step of changing the previously identified game player type for the current game player to the updated game player type.

In another embodiment, a game player type may be updated based on an analysis of an additional set of not just one, but a plurality of game play periods, data sets, factors, or a combination of any of the foregoing.

The system can then optionally make a determination as to whether to update the game player type 116. In certain embodiments, the system default may be set to update the game player type and no separate determination step is necessary. In an instance where the game player type is updated, the method may proceed to display a selection of games 108 associated with the newly identified, updated, game player type. In an instance where the game player type remains unchanged, the process may continue to collect a new or the same second set of data 110 and then work back through the steps of analyzing the new or updated second set of data 112 and a subsequent determination of the game player type 114. Alternatively, where the game player type remains unchanged, the method may end (not shown).

In another embodiment, the system may request and receive feedback from the game player related to the player's rating of the recently played game. For instance the system may be configured so that a player can assign a numeric rating to the recently played game. Data from this rating may be combined with data about the recently played game to update a previously-determined game player type. In another embodiment, the method involves updating a previously-determined at least one game player type based on an additional set of data, the additional set of data related to game player feedback reflecting a player indication of how often the player would play the game. The indication of how often the player would play the game may be received from the player in the form of a selected set of responses, for instance indicating the player would play often, sometimes, or never.

The system may then display 108, on a video display, the selection of games identified for the game player type determined by the analysis of the second set of data. The player may then make a selection of the one of the displayed games and the game machine presents the selected game to the player.

Figure 7:
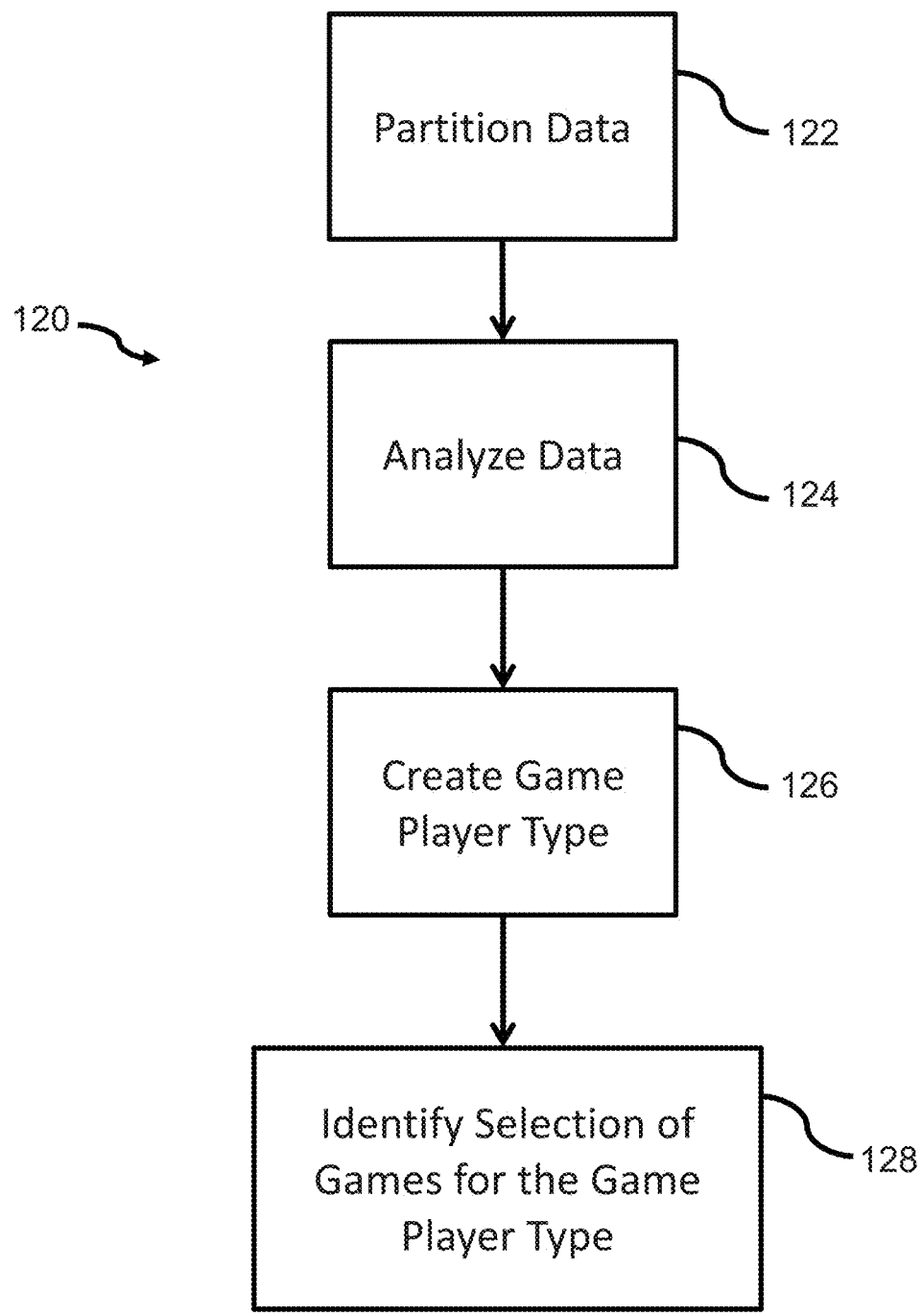
FIG. 7 is a flowchart illustrating a method of creating a game player type and identifying games suitable for the created game player type.

Referring now to FIG. 7, in another embodiment, a computer implemented method 120 is provided for creating a set of game player types for use in operating a wagering game. The method may include a first step (not shown) of collecting a set of data related to one or more game factors or game features, for instance based on actual, simulated or historical game play. In another embodiment of the method, the set of data related to one or more game factors may be previously available so that the step of collecting the data may not be required for the inventive method. Suitable game factors, also referred to herein as game features, are described throughout this disclosure.

An optional step involves partitioning the set of data 122 into one or more game play periods. Each game play period may represent a continuous or relatively continuous period of game play, for instance, a series of consecutive games played by a player in one sitting at an electronic gaming machine.

This step may be combined with the step of collecting the data and it may also be combined with the step of analyzing the data 124. In addition, gaming data may be held in a central repository and be partitioned based on geo zones which may reflect local or country based partitioning. The system may offer a mix of selection from within various partitions based upon language; geo zones as well as time sliced processed data.

The data is analyzed 124 to identify instances of the game factors described above, including the frequency of appearance of the game factors, their distribution within the data set, and clusters, trends or other patters are identified. Certain game factors, or indicators, may be weighted or the dimensions of measurement adjusted so that they are more important or less important than other factors in the overall analysis of the data. In one embodiment, the data analysis is performed using a cluster analysis of the set of data within each game play period. Additionally, or alternatively, the analysis may be performed against the set of data without partitioning into game play periods.

The data analysis allows the system to create at least one game player type 126. In one embodiment, the game player type is an association or collection of one or more game factors, such as those described above. This association or collection may represent a particular model of game player. For instance, the data analysis may show that certain players prefer games that are quickly resolved (from start to finish) and have small wager amounts. Data suggesting this trend could be used to create a game player type based on this trend. In one embodiment, the game player type is a collection of data including an identifier that allows the system to identify the collection of data, and, optionally, that the data provides a game player type. The game player type may also include data which indicates the game factors defining the particular features of the games to be affiliated with the game player type. These features may be identified in the affirmative, for instance as features that should or are preferably present in the games to be affiliated with the game player type. Alternatively, or additionally, some features may be identified in the negative, for instance features that should not be or are preferably not present in the games to be affiliated with the game player type.

In one embodiment, the method may include the system selecting games for the game player type based at least in part on the analysis of data from one or more game play periods or from analysis of the data set at large, without any partitioning or consideration of partitioning of the data into game play periods.

The method may also include the step of identifying a selection of games for a game player type 128. The identification is based on data related to the games and the information or data from the game player type. For instance, if the game player type is for players that like longer games with multiple rounds of wagers, then the system would identify a selection of games that exhibit these features. Data related to a game could be provided manually or it could be generated in a separate data analysis step, for instance analysis of data representative of game play activity, for instance, live, virtual or historical play of a given game. The data related to the games could include a combination of data entered manually, for instance game theme data, as well as other data collected or assembled through analysis of game play activity. Alternatively, the system may identify a selection of games based directly on the analysis of the set of data, without any creation of a game player type. In this embodiment, the selection of games may be based directly on the results of the cluster or trend analysis.

The above-described embodiments of the present invention can be implemented in any of numerous ways. For example, the embodiments may be implemented using hardware, software or a suitable combination thereof. When implemented in software, the software code can be executed on any suitable processor or collection of processors, whether provided in a single computer or distributed among multiple computers. Such processors may be implemented as integrated circuits, with one or more processors in an integrated circuit component. Further, a processor may be implemented using circuitry in any suitable format.

It should be appreciated that a computer may be embodied in any of a number of forms, such as a rack-mounted computer, a desktop computer, a laptop computer, or a tablet computer. Additionally, a computer may be embedded in a device perhaps not generally regarded as a computer but with suitable processing capabilities, including an electronic gaming machine, a Web TV, a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks. As used herein, the term "online" refers to such networked systems, including computers networked using, e.g., dedicated lines, telephone lines, cable or ISDN lines as well as wireless transmissions. Online systems include remote computers using, e.g., a local area network (LAN), a wide area network (WAN), the Internet, as well as various combinations of the foregoing. Suitable user devices may connect to a network for instance, any computing device that is capable of communicating over a network, such as a desktop, laptop or notebook computer, a mobile station or terminal, an entertainment appliance, a set-top box in communication with a display device, a wireless device such as a phone or smartphone, a game console, etc. The term "online gaming" refers to those systems and methods that make use of such a network to allow a game player to make use of and engage in gaming activity through networked, or online systems, both remote and local. For instance, "online gaming" includes gaming activity that is made available through a website on the Internet.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a tangible, non-transitory computer readable storage medium (or multiple computer readable storage media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other non-transitory, tangible computer-readable storage media) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above. As used herein, the term "non-transitory computer-readable storage medium" encompasses only a computer-readable medium that can be considered to be a manufacture (i.e., article of manufacture) or a machine and excludes transitory signals.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags, addresses or other mechanisms that establish relationship between data elements.

Various aspects of the present invention may be used alone, in combination, or in a variety of arrangements not specifically discussed in the embodiments described in the foregoing and the concepts described herein are therefore not limited in their application to the details and arrangement of components set forth in the foregoing description or illustrated in the drawings. For example, aspects described in one embodiment may be combined in any manner with aspects described in other embodiments.

Also, the invention may be embodied as a method, of which several examples haves been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While the invention has been described with reference to certain exemplary embodiments thereof, those skilled in the art may make various modifications to the described embodiments of the invention without departing from the true spirit and scope of the invention. The terms and descriptions used herein are set forth by way of illustration only and not meant as limitations. In particular, although the present invention has been described by way of examples, a variety of devices would practice the inventive concepts described herein. Although the invention has been described and disclosed in various terms and certain embodiments, the scope of the invention is not intended to be, nor should it be deemed to be, limited thereby and such other modifications or embodiments as may be suggested by the teachings herein are particularly reserved, especially as they fall within the breadth and scope of the claims here appended. Those skilled in the art will recognize that these and other variations are possible within the spirit and scope of the invention as defined in the following claims and their equivalents.

What is claimed is:

1. A computer implemented method of operating a wagering game system in real time, comprising the steps of:
    establishing a communication link using network infrastructure between a plurality of gaming devices and a central recommender processor, wherein each gaming device is operated by a player having a wagering game system registration, and wherein each gaming device is programmed to carry out game functions of receiving wagering and game instructions, determining a game outcome and determining an award;
    generating a gaming and play behavior model by partitioning stored play data into a plurality of game session patterns, each game session pattern corresponds to a time period and indicates occurrence of game factors over the time period;
    detecting, at the recommender processor, in real time or near real time that a current player begins to play a game or indicates a desire to play the game using a first gaming device of the plurality of gaming devices;
    collecting, by the recommender processor from the first gaming device using the communication link, at the moment of the detection that the current player begins to play the game or indicates the desire to play the game, a first set of real time game data defining occurrence of game factors for game play in an ongoing live game;
    determining, by the recommender processor, that the first set of real time game data has been collected for a minimum length of time of game play required to categorize game behaviour using the plurality of game session patterns;
    matching, by the recommender processor, the first set of real time game data to a first set of game session patterns of the plurality of game session patterns;
    determining, by the recommender processor, at least one game player type from among a set of predefined game player types for the current game player based on the first set of game session patterns; and
    transmitting from the recommender processor to the first gaming device using the communication link, a selection of games identified for the determined at least one game player type.

2. The method of claim 1, wherein the step of generating the gaming and play behavior model comprises: performing a cluster analysis of the plurality of game session patterns to group game session patterns into different clusters, wherein each game cluster is linked to one or more games, and wherein the method further comprises identifying a cluster of game session patterns based on the first set of game session patterns.

3. The method of claim 1, wherein the step of generating the gaming and play behavior model comprises: detecting indicators from within the plurality of game sessions.

4. The method of claim 1, wherein the step of generating the gaming and play behavior model comprises: detecting trends within the plurality of game session patterns.

5. The method of claim 1, further comprising the step of receiving, from the first gaming device using the communication link, an indicator of the game players system registration.

6. The method of claim 1, wherein the plurality of game session patterns represents at least one game factor selected from the group consisting of: game session length, play behavior, game behavior, game language, game location, game selection, elapsed time with one game, wagering behavior, game type, game theme, wager amounts, wager denominations, play rates, typical bonus values, game brand, prize distributions, amounts of incremental wagers, frequency of wagering, for instance the presence or absence of multiple rounds of wagering in a game, the number of rounds of wagers permitted in a game, maximum wager amounts permitted, minimum wager amounts permitted, amount of wagering, elapsed time between selected events for instance starting a new game, reaction to bonus rounds, reaction to progressive outputs, pay table features, amount of incremental wagers, frequency of wagering, elapsed time for player reaction, amount of wagering, elapsed time between wagers, frequency of player action, game rules, game complexity, ability for a player to control or have an effect on a game outcome, whether an outcome is predetermined, whether parallel wagering is provided, average game speed, average wager amounts, average wager rate, presence or frequency of bonus rounds, presence and frequency of progressive outputs, payout percentages, win rates, win percentages, loss rates, loss percentages, use of special features, frequency of use of special features, number of lines played, total amount wagered, and type of payment received.

7. The method of claim 1, wherein the step of collecting involves collecting data for a predetermined length of time.

8. The method of claim 1 further comprising the step of: receiving a selection of another game from the selection of games to play from the first gaming device and collecting, by the recommender processor from the first gaming device using the communication link, at the moment of the detection that the current player begins to play the other or indicates a desire to play the other game, a second set of real-time game data related to game factors for game play in an ongoing live game of the other game.

9. The method of claim 1, further comprising the step of: determining that the first set of real time game data comprises responsible gaming data related to the player and including the responsible gaming data in the determination of the at least one game player type.

10. The method of claim 1, further comprising the step of: determining that the first set of real time game data comprises social network data related to the game player and including the social network data in the determination of the at least one game player type.

11. The method of claim 1, further comprising the step of: transmitting signals to the first gaming device from the recommender processor requesting that a player input at least one of a social network account identifier and a wagering game system registration identifier.

12. The method of claim 1, further comprising the step of: updating a previously-determined at least one game player type based on an additional set of real time game data, the additional set of real time game data related to game factors for an additional time period of game play in a live ongoing game by the current game player.

13. The method of claim 12, wherein the first set of real time game data and the additional set of real time game data are related to distinct time periods.

14. The method of claim 12, wherein the first set of real time game data and the additional set of real time game data are related to overlapping time periods.

15. The method of claim 14, wherein the additional set of real time game data is larger than the first set of real time game data.

16. The method of claim 14, wherein the additional set of real time game data relates to a longer time period of game play than the first set of real time game data.

17. The method of claim 1, wherein the step of determining at least one game player type further involves factoring in geographical data related to a location of the first gaming device carrying out the ongoing live game.

18. The method of claim 1, wherein the step of determining at least one game player type further involves factoring in language data related to a language of the first gaming device carrying out the ongoing live game.

19. The method of claim 1, further comprising the step of receiving an indication of agreement to monitoring of game play at the recommender processor from the first gaming device through the communication link.

20. The method of claim 1, further comprising the step of receiving an indication of agreement to collection of game play data at the recommender processor from the first gaming device through the communication link.

21. The method of claim 1, further comprising the step of determining that the first set of game session patterns of the plurality of game session patterns comprises responsible gaming data related to registered game players and including the first set of game session patterns comprising the responsible gaming data in the determination of the at least one game player type and recommending at least one game to the current player that has previously been recommended to registered game players that have substantially the same game player type.

22. The method of claim 21, wherein the responsible gaming data is stored separately from first set of real time game data related to current game player.

23. The method of claim 1, further comprising the step of: updating a previously-determined at least one game player type based on an additional set of real time game data, the additional set of real time game data related to game player feedback reflecting a player rating of the ongoing live game.

24. The method of claim 1, further comprising the step of: updating a previously-determined at least one game player type based on an additional set of real time game data, the additional set of real time game data related to game player feedback reflecting a player indication of how often the player would play the game.

25. The method of claim 1 wherein a first game session pattern of the plurality of game session patterns corresponds to a first time period and second game session pattern of the plurality of game session patterns corresponds to a second time period, wherein the first time period is longer than the second time period.

26. The method of claim 1, wherein at least a portion of the stored play data used for generating the gaming and play behavior model is linked to the player's wagering game system registration.

27. The method of claim 1, further comprising:
detecting, at the recommender processor, in real time or near real time that another current player begins to play a game or indicates a desire to play the game using a second gaming device of the plurality of gaming devices;

collecting, by the recommender processor from the second gaming device using the communication link, at the moment of the detection that the other current player begins to play the game or indicates the desire to play the game, a second set of real time game data defining occurrence of game factors for game play in another ongoing live game;

determining, by the recommender processor, that the second set of real time game data has been collected for a minimum length of time of game play required to categorize game behaviour using the plurality of game session patterns;

matching, by the recommender processor, the second set of real time game data to a first set of game session patterns of the plurality of game session patterns;

determining, by the recommender processor, another at least one game player type from among the set of predefined game player types for the game player based on the first set of game session patterns; and transmitting from the recommender processor to the second gaming device using the communication link, a selection of games identified for the determined at least one game player type.

28. A wagering game system comprising:
a plurality of electronic gaming machines configured to provide a selection of wagering games to players having wagering game system registrations;
a recommender processor configured to:
  generate a gaming and play behavior model by partitioning play data into a plurality of game session patterns, each game session pattern corresponds to a time period and indicates occurrence of game factors over the time period;
  detect in real time or near real time that a current player begins to play a game or indicates a desire to play the game using a first electronic gaming machine of the plurality of electronic gaming machines;
  collect, from the electronic gaming machine using a communication link, at the moment of the detection that the current player begins to play the game or indicates a desire to play the game, a first set of real time game data related to game factors for game play in an ongoing live game;
  determine that the first set of real-time game data has been collected for a minimum length of time of game play required to categorize game behaviour using the respective game session patterns;
  match the first set of real-time game data to a first set of game session patterns of the plurality of game sessions;
  determine at least one game player type from among a set of predefined game player types for a game player based on the matched game sessions,
  transmit, to the first electronic gaming machine using the communication link, the selection of wagering games which are identified based on the determined at least one game player type; and
  the communication link, the communication link having network infrastructure to link the central recommender processor to the plurality of electronic gaming machines.

29. The system of claim 28, wherein the recommender processor is configured to generate the gaming and play behavior model by performing a cluster analysis of the plurality of game session patterns to group game session patterns into different clusters, wherein each game cluster is linked to one or more games, and wherein the recommender processor is configured to identify a cluster of game session patterns based on the first set of game session patterns.

30. The system of claim 28, wherein the plurality of game session patterns represents at least one game factor selected from the group consisting of: game session length, play behavior, game behavior, game language, game location, game selection, elapsed time with one game, wagering behavior, game type, game theme, wager amounts, wager denominations, play rates, typical bonus values, game brand, prize distributions, amounts of incremental wagers, frequency of wagering, for instance the presence or absence of multiple rounds of wagering in a game, the number of rounds of wagers permitted in a game, maximum wager amounts permitted, minimum wager amounts permitted, amount of wagering, elapsed time between selected events for instance starting a new game, reaction to bonus rounds, reaction to progressive outputs, pay table features, amount of incremental wagers, frequency of wagering, elapsed time for player reaction, amount of wagering, elapsed time between wagers, frequency of player action, game rules, game complexity, ability for a player to control or have an effect on a game outcome, whether an outcome is predetermined, whether parallel wagering is provided, average game speed, average wager amounts, average wager rate, presence or frequency of bonus rounds, presence and frequency of progressive outputs, payout percentages, win rates, win percentages, loss rates, loss percentages, use of special features, frequency of use of special features, number of lines played, total amount wagered, and type of payment received.

31. The system of claim 28, wherein the recommender processor is configured to receive a selection of another game from the selection of games to play from the first gaming device and collect, using the communication link, at the moment of the detection that the current player begins to play the other or indicates a desire to play the other game, a second set of real-time game data related to game factors for game play in an ongoing live game of the other game.

32. The system of claim 28, wherein the recommender processor is configured to determine that the first set of real time game data comprises responsible gaming data related to the player and include the responsible gaming data in the determination of the at least one game player type.

33. The system of claim 28, wherein the recommender processor is configured to determine that the first set of real time game data comprises social network data related to the game player and include the social network data in the determination of the at least one game player type.

34. The system of claim 28, wherein the recommender processor is configured to transmit signals to the first gaming device requesting that a player input at least one of a social network account identifier and a wagering game system registration identifier.

35. The system of claim 28, wherein the recommender processor is configured to update a previously-determined at least one game player type based on an additional set of real time game data, the additional set of real time game data related to game factors for an additional time period of game play in a live ongoing game by the current game player.

36. The system of claim 28, wherein the first set of real time game data and the additional set of real time game data are related to distinct time periods.

37. The system of claim 28, wherein the first set of real time game data and the additional set of real time game data are related to overlapping time periods.

38. The system of claim 28, wherein the additional set of real time game data is larger than the first set of real time game data.

39. The system of claim 28, wherein the additional set of real time game data relates to a longer time period of game play than the first set of real time game data.

40. The system of claim 28, wherein the recommender processor is configured to determine that the first set of game session patterns of the plurality of game session patterns comprises responsible gaming data related to registered game players and including the first set of game session patterns comprising the responsible gaming data in the determination of the at least one game player type and recommending at least one game to the current player that has previously been recommended to registered game players that have substantially the same game player type.

41. The system of claim 28, wherein the recommender processor is configured to update a previously-determined at least one game player type based on an additional set of real time game data, the additional set of real time game data related to game player feedback reflecting a player rating of the ongoing live game or a player indication of how often the player would play the game.

42. The system of claim 28, wherein a first game session pattern of the plurality of game session patterns corresponds to a first time period and second game session pattern of the plurality of game session patterns corresponds to a second time period, wherein the first time period is longer than the second time period.

43. The system of claim 28, wherein at least a portion of the stored play data used for generating the gaming and play behavior model is linked to the player's wagering game system registration.

44. The system of claim 28, wherein the recommender processor is configured to:
  detect in real time or near real time that another current player begins to play a game or indicates a desire to play the game using a second gaming device of the plurality of gaming devices;
  collect, from the second gaming device using the communication link, at the moment of the detection that the other current player begins to play the game or indicates the desire to play the game, a second set of real time game data defining occurrence of game factors for game play in another ongoing live game;
  determine that the second set of real time game data has been collected for a minimum length of time of game play required to categorize game behaviour using the plurality of game session patterns;
  match the second set of real time game data to a first set of game session patterns of the plurality of game session patterns;
  determine another at least one game player type from among the set of predefined game player types for the game player based on the first set of game session patterns; and
  transmit to the second gaming device using the communication link, a selection of games identified for the determined at least one game player type.

45. The system of claim 28, wherein the recommender processor is configured to determine at least one game player type further involves factoring in geographical data related to a location of the first gaming device carrying out the ongoing live game.

46. A non-transitory computer readable storage medium having instructions stored therein thereon, the instructions, when executed, being operable to cause a computerized wagering game system to:
  establish a communication link using network infrastructure with a plurality of electronic gaming machines;
  generate a gaming and play behavior model by partitioning play data into a plurality of game session patterns, each game session pattern corresponds to a time period and indicates occurrence of game features over the time period;
  detect in real time or near real time that the player begins to play a game or indicates a desire to play the game using a first electronic gaming machine of the plurality of electronic gaming machines;
  collect, from the first electronic gaming machine using the communication link, at the moment of the detection that a current player begins to play the game or indicates a desire to play the game, a first set of real time game data related to game factors for game play in an ongoing live game;
  determine that the first set of real-time game data has been collected for a minimum length of time of game play;
  match the first set of real-time game data to a first set of game session patterns of the plurality of game session patterns;
  determine at least one game player type from among a set of predefined game player types for the current player based on the first set of game session patterns; and
  transmit, to the first electronic gaming machine using the communication link, the selection of wagering games which are identified based on the determined at least one game player type.

47. The computer readable storage medium of claim 46, wherein a first game session pattern of the plurality of game session patterns corresponds to a first time period and second game session pattern of the plurality of game session patterns corresponds to a second time period, wherein the first time period is longer than the second time period.

48. The computer readable storage medium of claim 46, wherein at least a portion of the stored play data used for generating the gaming and play behavior model is linked to the player's wagering game system registration.

49. The computer readable storage medium of claim 46, the instructions, when executed, being operable to cause a computerized wagering game system to:
  detect in real time or near real time that another current player begins to play a game or indicates a desire to play the game using a second gaming device of the plurality of gaming devices;
  collect at the moment of the detection that the other current player begins to play the game or indicates the desire to play the game, a second set of real time game data defining occurrence of game factors for game play in another ongoing live game;
  determine that the second set of real time game data has been collected for a minimum length of time of game play required to categorize game behaviour using the plurality of game session patterns;
  match the second set of real time game data to a first set of game session patterns of the plurality of game session patterns;
  determine another at least one game player type from among the set of predefined game player types for the game player based on the first set of game session patterns; and transmit a selection of games identified for the determined at least one game player type.

\* \* \* \* \*